US006960335B1

(12) United States Patent
Singhal et al.

(10) Patent No.: US 6,960,335 B1
(45) Date of Patent: Nov. 1, 2005

(54) NANOSTRUCTURED AND LAYERED LITHIUM MANGANESE OXIDE AND METHOD OF MANUFACTURING THE SAME

(75) Inventors: Amit Singhal, Piscataway, NJ (US); Ganesh Skandan, Piscataway, NJ (US)

(73) Assignee: Nanopowder Enterprises Inc, Piscataway, NJ (US)

( * ) Notice: Subject to any disclaimer, the term of this patent is extended or adjusted under 35 U.S.C. 154(b) by 161 days.

(21) Appl. No.: 10/251,306

(22) Filed: Sep. 20, 2002

Related U.S. Application Data

(60) Provisional application No. 60/323,442, filed on Sep. 20, 2001.

(51) Int. Cl.$^7$ .......................... C01G 45/02; C01D 1/02; H01M 4/50; H01M 4/58
(52) U.S. Cl. ................. 423/599; 423/594.15; 429/224; 429/231.95
(58) Field of Search ........................... 423/599, 594.15; 429/224, 231.95

(56) References Cited

U.S. PATENT DOCUMENTS

| | | | |
|---|---|---|---|
| 6,482,374 B1 * | 11/2002 | Kumar et al. | 423/179.5 |
| 6,656,638 B1 * | 12/2003 | Yamaura | 429/231.95 |
| 6,677,082 B2 * | 1/2004 | Thackeray et al. | 429/224 |

\* cited by examiner

*Primary Examiner*—Stanley S. Silverman
*Assistant Examiner*—Jonas N. Strickland
(74) *Attorney, Agent, or Firm*—William L. Botjer

(57) ABSTRACT

Nanostructured and layered lithium manganese oxide powders and methods of producing same. The powders are represented by the chemical formula, $Li_xMn_{1-y}M_yO_2$, where $0.5 < x < 1.33$, $0 \leq y \leq 0.5$ and have an average primary particle diameter from 5 nm to 300 nm, preferably between 5 and 100 nm, and M is at least one cation dopant. The powders can be formed into active cathode materials in Li-ion and Li rechargeable batteries.

17 Claims, No Drawings

NANOSTRUCTURED AND LAYERED LITHIUM MANGANESE OXIDE AND METHOD OF MANUFACTURING THE SAME

CROSS REFERENCE TO RELATED APPLICATIONS

The application claims priority of U.S. provisional application No. 60/323,442 filed Sep. 20, 2001.

STATEMENT OF GOVERNMENT SUPPORT OF THE INVENTION

This work was done as part of a phase I SBIR contract from NASA under contract number NAS9-01042.

BACKGROUND OF THE INVENTION

This invention relates to the production and use of nanostructured layered lithium manganese oxide powders (i.e., primary particles of less than 300 nm and preferably in the size range of 5–100 nm) as active cathode materials in Li-ion and Li rechargeable batteries. A layered manganese oxide is a rock salt-structured material based on a close packed network of oxygen atoms with $Li^+$ and $Mn^{3+}$ ions ordering on alternating (111) planes of the cubic rock salt structure. Host electrodes with layered structures are of particular interest to the battery industry because they provide a two-dimensional interstitial space that allows for rapid lithium ion transport within the host (see M. M. Thackeray, Prog. Solid. St. Chem., 25, 1 (1997)). The electrochemical performance of nanostructured materials can exceed that of large-sized (coarse) particles of the same materials, because of the better diffusion of Li ions in nanostructured electrode materials during the discharging process and the smaller dimensional changes in cathode materials as Li ions cycle in and out during the discharging and charging process.

Rechargeable batteries are being used in increasing number in several military and commercial applications. They are also used to power portable equipment (e.g., power tools, camcorders and wireless communication devices). There is a tremendous demand for reliable and safe rechargeable batteries with high energy density, good cycling life, lightweight, and low cost. Rechargeable Li-ion batteries are becoming the system of choice because of their overall good performance and high energy density. State-of-the-art Li-ion batteries have an energy density of 125–150 Wh/kg. The energy density of Li-ion batteries can be enhanced by utilizing high energy density cathodes such as, layered lithium manganese oxide, $Li_xMnO_2$. The theoretical energy density of layered $Li_xMnO_2$ is ~950 Wh/kg (based on x=1 and a discharge voltage of 3.3 V), calculated on the basis of the weight of the electrochemically active material. Additionally, $Li_xMnO_2$ is a low cost and non-toxic material, which makes it very attractive as cathode material for rechargeable Li-ion batteries in commercial, aerospace and military applications. However, $Li_xMnO_2$ suffers from structural instability during electrochemical cycling and as a result, exhibits significant capacity fade. Furthermore, macrocrystalline materials have poor rate capabilities.

$Li_xMnO_2$ is found in many structural forms, each of which has a certain stability range so that as x in $Li_xMnO_2$ is varied, a different phase becomes thermodynamically stable. At low values of x, the spinel structure, $LiMn_2O_4$, is stable, whereas at higher x values, a layered structure (e.g., $LiMnO_2$) is stable. At higher values of x (>0.5), the spinel compound transforms to a layered compound with a significant volume change (~16%) because of the Jahn-Teller distortion; consequently, capacity of cathodes made of the spinel compound fades rapidly on cycling if cathodes are discharged to a higher value of x (>0.5). In case of an unstabilized $Li_xMnO_2$ layered compound, on charging, a spinel structure is formed; i.e., the manganese ions diffuse from the ordered configuration in the layered structure, and this transformed spinel phase will lose capacity on cycling in a voltage range of 4.2–2V.

In order to provide a stabilized $LiMnO_2$ structure, several researchers have doped this compound with a variety of cation dopants, such as $Al^{3+}$, $Co^{3+}$, $Ga^{3+}$ and $Cr^{3+}$. One research group prepared monoclinic layered $LiMnO_2$ powders through substitution of Mn in $LiMnO_2$ by small trivalent metal ions. In case of Al and Ga, the layered phase undergoes crystal structural transformations to spinel type phases, along with a capacity fade, during electrochemical cycling. A second research group synthesized $LiAl_{0.25}Mn_{0.75}O_2$ powders. The energy density of cathodes made of these powders in a Li-test cell was 450 Wh/kg and 545 Wh/kg at a discharge rate of C/5 and C/15, respectively. However these energy density numbers are far below the theoretical energy density (~950 Wh/kg) of layered $LiMnO_2$. The probable reason for these lower capacities of $LiAl_yMn_{1-y}O_2$ is the poor rate of diffusion of Li-ions into cathode particles and the poor electronic conductivity of $LiMnO_2$ phase. For instance, the second research group also observed that on raising the operating temperature of Li-test cells from 25° C. to 55° C., the capacity of $LiAl_yMn_{1-y}O_2$ increased significantly. A non-nanostructured layered lithium manganese oxide compound of the formula, $LiMn_{1-x}A_xO_2$ has been claimed to be produced in U.S. Pat. No. 6,361,756. In this compound, x varies between 0 and 0.5, A is a combination of two or more dopants, and the average oxidation state N of the dopant combination [A] is $+2.8 \leq N \leq 3.2$. Preferably, at least one of the dopants is either Ti or Zr.

SUMMARY OF THE INVENTION

This invention relates to nanostructured and layered lithium manganese oxide powders with improved Li-ion diffusion. Among lithium manganese compounds, spinel $LiMn_2O_4$ compound has been the most common material studied for use in rechargeable Li-ion batteries. Spinel $LiMn_2O_4$ phase on cycling for the range of $0 \leq x \leq 2$ exhibits three voltage plateau. During the discharging process, lithium is extracted from the tetrahedral 8a sites at approximately 4V in a two-stage process, separated by only 150 mV at a composition of $Li_{0.5}Mn_2O_4$; the two-step process is due to ordering of the lithium ions on one half of the tetrahedral 8a sites. For a voltage range of 4.2 to 3.5, which corresponds to a range of x between 0 and 1, the cubic symmetry of $Li_xMn_2O_4$ phase is not affected, and the capacity of the spinel compound does not fade significantly for this voltage range. In contrast, lithium insertion into $Li_{1+x}Mn_2O_4$ electrodes at the 3 V plateau is accompanied by a severe crystallographic Jahn-Teller distortion as a result of the increase concentration of $Mn^{3+}(d^4)$ in the spinel framework. This reduces the crystal symmetry from cubic (c/a=1.0) to tetragonal (c/a=1.16). The 16% increase in the c/a ratio is far too severe for the spinel electrode to withstand electrochemical cycling of lithium in and out of the structure. The strain imposed on the system is too great for the individual spinel particles to maintain structural integrity; they tend to break up and lose electrical contact, thereby resulting in rapid capacity loss of $Li/Li_xMn_2O_4$ cells. $Li_xMn_2O_4$ cathodes in the work done by a third group lost almost 50% of their capacity only after 11 cycles.

The present invention focuses on developing a layered $Li_xMnO_2$ material, which will not lose capacity on cycling between a voltage range of 4.2 to 2.0 V and will have a capacity larger than that of spinel $Li_xMn_2O_4$. Thus, the objective of the present invention is to demonstrate that besides stabilizing the layered structure, reducing the crystallite size will also improve the retention capacity of $Li_xMnO_2$ cathodes, because of the small dimensional changes in nanocrystalline materials.

DESCRIPTION OF THE PREFERRED EMBODIMENTS

In one aspect, the present invention provides nanostructured and layered lithium manganese oxide powders of the formula, LixMn1-yMyO2, where 0.5<x<1.33, 0≦y≦0.5, and where M is a metal cation dopant, having an average primary particle diameter or crystallite size from 5 nm to 300 nm. The average primary particle size is about 300 nm or less, preferably 5–100 nm. In another aspect, these primary particles are composed to form secondary particles in the range of 25 nm–2000 nm. The invention also includes using these nanostructured and layered $LiMnO_2$ powders as a cathode for rechargeable Li based devices, wherein the cathode also consists of a binder (such as, but not limited to: polyvinylidene fluoride, polyethylene oxide, polyethylene, polypropylene, polytetrafluoroethylene, polyacrylates and mixtures and copolymers thereof), and supplementary electrically conductive particles (such as but not limited to carbon) or a supplementary electrically conducting coating (such as but not limited to carbon) on the lithium manganese oxide particles.

In another aspect, the present invention also is directed to the method of producing these nanostructured and layered lithium manganese oxide powders. The process utilizes (i) manganese containing salt (such as, but not limited to: manganese nitrate, manganese carbonate, manganese acetate, manganese chloride, manganese 2,-4 pentanedionate, manganese formate, manganese oxalate and manganese alkoxides) and/or manganese oxide nanoparticles, (ii) metal oxide nanoparticles (such as, but not limited to $Al_2O_3$, $V_2O_5$, $Ga_2O_3$, $Y_2O_3$, $Co_3O_4$, NiO and $Fe_2O_3$) or chemical precursors of cation dopants, (such as, but not limited to: metal nitrate, metal hydroxide, metal acetate, metal chloride, metal 2,-4 pentanedionate, metal alkoxide and metal oxalate. (iii) sodium salt (such as, but not limited to: sodium carbonate, sodium hydroxide, sodium chloride, sodium nitrate, sodium citrate, sodium acetate and sodium alkoxides (e.g., sodium ethoxide)., (iv) a polymeric dispersant, the polymeric dispersant can be either organic, giving rise to steric stabilization, or ionizable (i.e., polyelectrolytes), in which case the stabilization is produced by steric and electrostatic repulsion (i.e., electrosteric repulsion), the polymer molecules are thus either physically adsorbed on or chemically bonded with nanoparticles (v) a lithium salt (such as, but not limited to: lithium nitrate, lithium halides, lithium carbonate, lithium hydroxide and lithium acetate, and (vi) solvents (aqueous and organic) with a boiling point in the range of 70–230° C. The process is carried out at pressures in the range of 0.5 to 10 atmospheres, with a preferred range of 1 to 4 atmospheres.

In the present chemical synthesis method, a manganese salt and a precursor of cation dopants, wherein the cation dopants have an oxidation state between 1+ to 6+, preferably with an oxidation state of 3+, such as $Al^{3+}$, $Co^{3+}$, $Ga^{3+}$, $V^{5+}$ and $Ni^{2+}$ is dissolved/dispersed in water, and manganese oxide is precipitated with a mixture of sodium carbonate and ammonium hydroxide in the presence of an organic dispersant (e.g., dextran, polymethylacrylic acid (PMAA), or polyacrylic acid (PAA)) at above ambient temperatures in the range of 25–100° C. The solid powder is removed either by evaporating, filtering or centrifuging. The solid, with a $Na_xMn_yM_{1-y}O_2$ composition, is calcined at a temperature in the range of 150–600° C. in a controlled atmosphere. The calcined powder is annealed at relatively low temperatures (500–900° C.) in a controlled atmosphere to achieve the appropriate crystalline phase. Once the crystallization of layered phase is completed, further high temperature annealing will form coarse particles by promoting sintering between the particles. Therefore, the lowest possible annealing temperature needs to be utilized in order to maintain the nanostructured nature of lithium manganese oxide particles. A micrograph taken by a transmission electron microscope (TEM), of the $Na_xMn_{1-y}Al_yO_2$ powder clearly shows well-defined crystals in the size range of 150–200 nm. The surface area of this powder was 7.2 $m^2/g$ that is equivalent to a particle size of ~200 nm, consistent with the TEM data.

Crystallized $Na_xMn_{1-y}M_yO_2$ powders were lithiated by exchanging sodium ions with Li in an organic solution (boiling point: 70–230° C.) containing a lithium salt. The lithiation process has been described by others. Lithium salt in a 5–8 fold in excess is dissolved in the organic solvent, which contains the appropriate amount of $Na_xMn_{1-y}M_yO_2$ powders. This mixture was refluxed between 7–16 hours, and after completing the reaction, solutions were centrifuged. Powders were washed three times with ethanol to remove any residual lithium salt.

$Li_xMn_{1-y}M_yO_2$ powders showed broad X-ray diffraction peaks, which suggest the small crystallite size of particles. X-ray diffraction patterns, of a nano—$Li_xMn_{1-y}Al_yO_2$ exhibits broad peaks (full width at half-maximum ~0.5° at 2θ=33° and 39.5°) indicating a monoclinic —$LiMnO_2$ phase. A TEM micrograph of this powder clearly shows that primary particles are well below 100 nm in diameter. The surface area of powders significantly increased on lithation. This implies that lithiation reduces the particle size. For example, the initial surface area of a nano —$Li_xMn_{1-y}Al_yO_2$ powder was 7.4 $m^2/g$, which increased to 13.9 $m^2/g$ on lithation. Energy Dispersive Spectroscopy (EDS) results on nanostructured powders suggested that the most of the sodium ions were exchanged with Li-ions in case of powders prepared by ion-exchange step in 2-methoxyethanol. EDS studies on a nano—$Li_xMn_{1-y}Al_yO_2$ powder was performed, and only a small amount of sodium was observed.

Electrochemical characterization of $Li_xMn_{1-y}M_yO_2$ cathodes was performed in a standard coin cell configuration. All electrodes besides lithium were made by the PLION™ process (see U.S. Pat. No. 5,456,000) The $Li_xMn_{1-y}M_yO_2$ active material was mixed with carbon black (MMM super P), oly(vinylidene fluoride-co-hexafluoropropylene) binder (Elf Atochem, Kynar 2801), and dibutyl phthalate plasticizer in acetone. The mixture was cast and dried at 22° C. for 0.5 hr. Afterwards, disks were punched from the freestanding tape. The disks were then placed in ether to extract the plasticizer. These disks were then utilized as working electrodes in Li metal coin cells. Coin cells were fabricated in a −80° C. dewpoint glovebox. 1M $LiPF_6$ in ethylene carbonate/dimethyl carbonate solvent (Merck) was used as the electrolyte. Borosilicate glass fiber was used as the separator between the positive and negative electrodes. All cells were cycled under constant current close to equilibrium conditions between 2 and 4.2V at a current density of 7.5 mA/g unless specified otherwise.

Details on electrochemical results for a variety of powders with a different type and content of cation dopants and produced with different processing conditions are explained in several examples, as indicated below:

EXAMPLE 1

Nanostructured $Li_xMn_{1-y}M_yO_2$ Powders with One Cation Dopant 22.4 g of manganese acetate was dissolved in 150 ml of distilled water, and 2.55 g of 20 wt % alumina suspension (primary particle size ~20 nm; average secondary particle size ~100 nm) was dispersed in manganese acetate solution. In another flask, 6.0 g of dextran (molecular weight: 60,000–90,000) was dissolved in 90 ml of 0.5M $Na_2CO_3$ solution. The $Na_2CO_3$/dextran solution was heated to a temperature of 80° C. While this solution is at 80° C., the manganese acetate/alumina solution was added drop-wise into the hot solution. After completely adding the manganese acetate/alumina solution, the final solution was stirred for 15–30 min. before evaporating the excess water. The dried solid was heated in an oxygen atmosphere at a rate of 2° C./min. to a temperature of 300° C., and the temperature was maintained for about 8 hrs. The calcined powder was heat-treated in a nitrogen atmosphere at a rate of 5° C./min. to a temperature of 800° C. for 4 hrs to obtain a crystalline and layered $Na_{0.9}Mn_{0.9}Al_{0.1}O_2$ phase.

Crystallized $Na_{0.9}Mn_{0.9}Al_{0.1}O_2$ powders were lithiated by exchanging sodium ions with Li in a LiBr/2-methoxyethanol solution. 4.3 g of LiBr was dissolved in 30 ml of 2-methoxyethanol for each gram of $Na_{0.9}Mn_{0.9}Al_{0.1}O_2$ powder. The $LiBr/Na_{0.9}Mn_{0.9}Al_{0.1}O_2$ suspension was refluxed for ~8 hrs. The powder was washed three times with ethanol to remove any residual LiBr, and the washed powder was dried in vacuum to obtain $Li_{0.9}Mn_{0.9}Al_{0.1}O_2$. The X-ray diffraction pattern exhibits broad peaks of the layered monoclinic—$LiMnO_2$ phase, suggesting the nanostructured nature of particles. A TEM micrograph clearly shows that the average primary particle size is well below 100 nm. EDS was performed on $Li_{0.9}Mn_{0.9}Al_{0.1}O_2$, and the result suggests that most of the sodium ions were exchanged with Li-ions.

A discharge-charge voltage curve (4.2–2.0V) of $Li_{0.9}Mn_{0.9}Al_{0.1}O_2$ shows that nanostructured $Li_xMn_{1-y}Al_yO_2$ cathodes have a smooth voltage profile because of the stable layered structure and smaller crystallite size of particles. On the other hand, unstable macrocrystalline $Li_xMnO_2$ cathodes will transform to a spinel $LiMn_2O_4$ phase on first charge, and subsequent electrochemical profile of cathodes on further discharge will have three plateau as described elsewhere. Nanostructured $Li_{0.9}Mn_{0.9}Al_{0.1}O_2$ started to show the voltage steps after 13 cycles. However, the capacity of the cathode made of this powder did not fade on cycling. The initial capacity was a little over 100 mAh/g, but on further cycling the discharge capacity increased progressively, and saturated after about 9 cycles at ~140 mAh/g. Other researchers (see Y-II Jang, B. Huang, Y-M Chiang and D. R. Sadoway, Electrochemical and Solid-State Letters, 1, 13 (1998)) have also observed the increase in capacity on cycling for Al-doped layered lithium manganese oxide compounds. It is theorized that this is happening because new intercalation sites are created as Li-ions are cycled in and out.

EXAMPLE 2

Effect of Calcination Temperature

The calcination temperature is observed to have a significant effect on the final electrochemical properties of the powder. The steps used to produce nanostructured $Li_{0.9}Mn_{0.75}Al_{0.25}O_2$ were similar to the one described in Example 1. 9.19 g of manganese acetate was dissolved in 75 ml of distilled water, and 3.19 g of 20 wt % alumina suspension (primary particle size ~20 nm; average secondary particle size ~100 nm) was dispersed in the manganese acetate solution. In another flask, 3.0 g of dextran (molecular weight: 60,000–90,000) was dissolved in 45 ml of 0.5 M $Na_2CO_3$ solution. The $Na_2CO_3$/dextran solution was heated to a temperature of 80° C. While this solution is at 80° C., the manganese acetate/alumina solution is added drop-wise into the hot solution. After completely adding the manganese acetate/alumina solution, the final solution was stirred for 15–30 min. before evaporating the excess water. The dried solid was divided into two parts. The first part was heated in an oxygen atmosphere at a rate of 3° C./min. to a temperature of 300° C. at which it was maintained for about 8 hrs for removing the volatile compounds. The second part was heated in an oxygen atmosphere at a rate of 3° C./min. to a temperature of 450° C. at which it was maintained for about 8 hrs for removing the volatile compounds. Both calcined powders were heat-treated in a nitrogen atmosphere at a rate of 5° C./min. to a temperature of 800° C. at which it was maintained for about 4 hrs to obtain a crystalline and layered $Na_{0.9}Mn_{0.755}Al_{0.25}O_2$ phase. Crystallized $Na_{0.9}Mn_{0.755}Al_{0.25}O_2$ powders were lithiated by an ion-exchange process as described in Example 1.

Electrochemical tests suggest that both powders were electrochemically active; however, on increasing the calcination temperature from 300 to 450° C. and preferably in the range of 500 to 900° C. the capacity of cathode material increased by more than 50%, while significantly reducing the irreversibility capacity loss. High irreversible capacity loss was observed with the powder calcined at the lower temperature because the residual organic in powders was getting oxidized during the charging process. On increasing the calcination temperature, the amount of residual organic in powders was reduced, and as a result, the irreversible capacity loss was reduced.

EXAMPLE 3

Nanostructured $Li_xMn_{1-y}M_yO_2$ Powders with More Than One Cation Dopant

Nanostructured $Li_xMn_{0.8}Al_{0.1}Co_{0.1}O_2$ was synthesized to demonstrate that the preparation method described in the present invention can be used to manufacture electrochemically active powders with more than one dopant. 22.4 g of manganese acetate and 2.59 g of cobalt acetate were dissolved in a 150 ml of distilled water, and 2.55 g of 20 wt % alumina suspension (primary particle size ~20 nm; average secondary particle size ~100 nm) or dry nanopowders was dispersed in the manganese acetate solution. In another flask, 6.0 g of dextran (molecular weight: 3000) was dissolved in 90 ml of 0.5 M $Na_2CO_3$ solution. The $Na_2CO_3$/dextran solution was heated to a temperature of 80° C. While this solution was at 80° C., the manganese acetate/alumina solution was added slowly (i.e. drop-wise) into the hot solution. Nanostructured $Li_xMn_{0.8}Al_{0.1}Co_{0.1}O_2$ was also synthesized by stabilizing nanoparticles with a PMAA-based dispersant. In this case, 0.6 g of Darvan-7 (commercial dispersant) was used instead of the dextran. In both cases, precipitated $Na_xMn_{0.8}Al_{0.1}Co_{0.1}O_2$ powders were calcined in an oxygen atmosphere at a rate of 2° C./min. to a temperature of 300° C. at which it was maintained for 8–10 hrs. Calcined powders were crystallized by heating at 700° C. for 4.0 hrs in an inert atmospheres. Crystallized $Na_xMn_{0.8}Al_{0.1}Co_{0.1}O_2$ powders were lithiated by a method described in example 1.

X-ray data on both powders exhibit broad peaks of monoclinic-$LiMnO_2$ cathodes made of these two powders do not lose significant capacity on cycling. In the case of lithium manganese powders, produced using dextran, the initial capacity was a little over 120 mAh/g, but on further cycling the discharge capacity increased progressively, and saturates after about 9 cycles at ~143 mAh/g. After 50 cycles, there is only 5% loss in capacity.

The present invention has been described with respect to exemplary embodiments. However, as those skilled in the art will recognize, modifications and variations in the specific details which have been described and illustrated may be resorted to without departing from the spirit and scope of the invention as defined in the appended claims.

We claim:

1. Nanostructured lithium manganese oxide powders, of the chemical formula, $Li_xMn_{1-y}M_yO_2$, where $0.5<x<1.33$, $0 \leq y \leq 0.5$ having a layered orthorhombic or monoclinic crystal structure with an average primary particle diameter from 5 nm to 300 nm, and wherein M is at least one cation dopant.

2. The lithium manganese oxide powder of claim 1, wherein the average aggregate secondary particle size of nanostructured and layered lithium manganese oxide powder is in the range of 25–2000 nm.

3. The lithium manganese oxide powder of claim 1, wherein M is a cation with an oxidation state between 1+ to 6+.

4. The Lithium manganese oxide powders of claim 3, further including a binder for forming a positive electrode composition.

5. The lithium manganese oxide powder of claim 4, wherein the binder is selected from the group consisting of polyvinylidene fluoride, polyethylene oxide, polyethylene, polypropylene, polytetrafluoroethylene, polyacrylates and mixtures and copolymers thereof.

6. The lithium manganese oxide powder of claim 4, wherein electrode also contains at least one of: a) conductive particles and b) an electrically conductive coating on the lithium manganese oxide particles.

7. The lithium manganese oxide powder of claim 4, wherein the electrically conductive particles and electrically conductive coatings on lithium manganese oxide particles comprise carbon.

8. The lithium manganese oxide powder of claim 1, wherein M is a cation with an oxidation state of 3+.

9. The lithium manganese oxide powder of claim 1, wherein M is selected form the group consisting of Al, Co, Ga, V and Ni.

10. A positive electrode material comprising:
   a) nanostructured lithium manganese oxide powders of the chemical formula, $Li_xMn_{1-y}M_yO_2$, where $0.5<x<1.33$, $0 \leq y \leq 0.5$, said lithium manganese oxide powders having a layered orthorhombic or monoclinic crystal structure with an average primary particle diameter of less than 300 nm, and wherein M is at least one cation dopant; and
   b) a binder.

11. The electrode material as claimed in claim 10, wherein the binder is selected from the group consisting of polyvinylidene fluoride, polyethylene oxide, polyethylene, polypropylene, polytetrafluoroethylene, polyacrylates and mixtures and copolymers thereof.

12. The electrode material as claimed in claim 10, further including at least one of: conductive particles and an electrically conductive coating on the lithium manganese oxide particles.

13. The electrode material as claimed in claim 12, wherein the electrically conductive particles and electrically conductive coatings on the lithium manganese oxide particles comprise carbon.

14. The electrode material as claimed in claim 10, wherein the average secondary particle size of nanostructured and layered lithium manganese oxide powder is in the range of 25–2000 nm.

15. The electrode material as claimed in claim 10, wherein M is a cation with an oxidation state between 1+ to 6+.

16. The electrode material as claimed in claim 10, wherein M is a cation with an oxidation state of 3+.

17. The electrode material as claimed in claim 10, wherein M is selected form the group consisting of Al, Co, Ga, V and Ni.

* * * * *